W. P. JENNY
INVENTOR.

BY Lester B. Clark
ATTORNEY

Oct. 28, 1941.　　W. P. JENNY　　2,261,030
MICROMAGNETIC PROSPECTING DEVICE
Filed Dec. 27, 1940　　2 Sheets-Sheet 2

W. P. JENNY
INVENTOR.

Lester B. Clark
ATTORNEY

Patented Oct. 28, 1941

2,261,030

UNITED STATES PATENT OFFICE 2,261,030

MICROMAGNETIC PROSPECTING DEVICE

William P. Jenny, Houston, Tex.

Application December 27, 1940, Serial No. 371,901

12 Claims. (Cl. 175—182)

This invention relates to the measurement of the terrestrial magnetic field and more particularly to the determination of the magnetic gradient and the direction of such field with such accuracy that magnetic anomalies at the surface of the earth can be ascertained as an indication of subsurface structures and deposits creating such anomalies.

It is known that subsurface earth structures, mineral deposits, etc. create magnetic anomalies in the earth's magnetic field at the surface of the earth. These anomalies are often very small, amounting to only two to twenty gammas and hence are easily overlooked or at least their presence is known with such uncertainty by the present methods of prospecting with the magnetic variometer or magnetometer that little can be deduced from indications of such anomalies.

The present invention provides an instrument and technique whereby an accurate measurement of small magnetic anomalies is made available. For the purpose of this disclosure the results so obtained are referred to herein as micromagnetic surveys.

The primary object of the invention is to provide means and method for obtaining micromagnetic surveys to determine the nature, location and extent of subsurface formations and deposits in the earth.

Another object is to provide a device of the class described which measures the rate and direction of change of the terrestrial magnetic field at each point of observation.

Still another object is to provide an instrument in which the effects of gravitational attraction are eliminated.

Another object is to provide a device which operates on the general principle of the gravimetric torsion balance but which is so constructed and arranged as to determine magnetic gradient and direction within anomalous magnetic areas.

These and further objects of the invention will be apparent from the following description considered in connection with the drawings in which.

Figure 1:
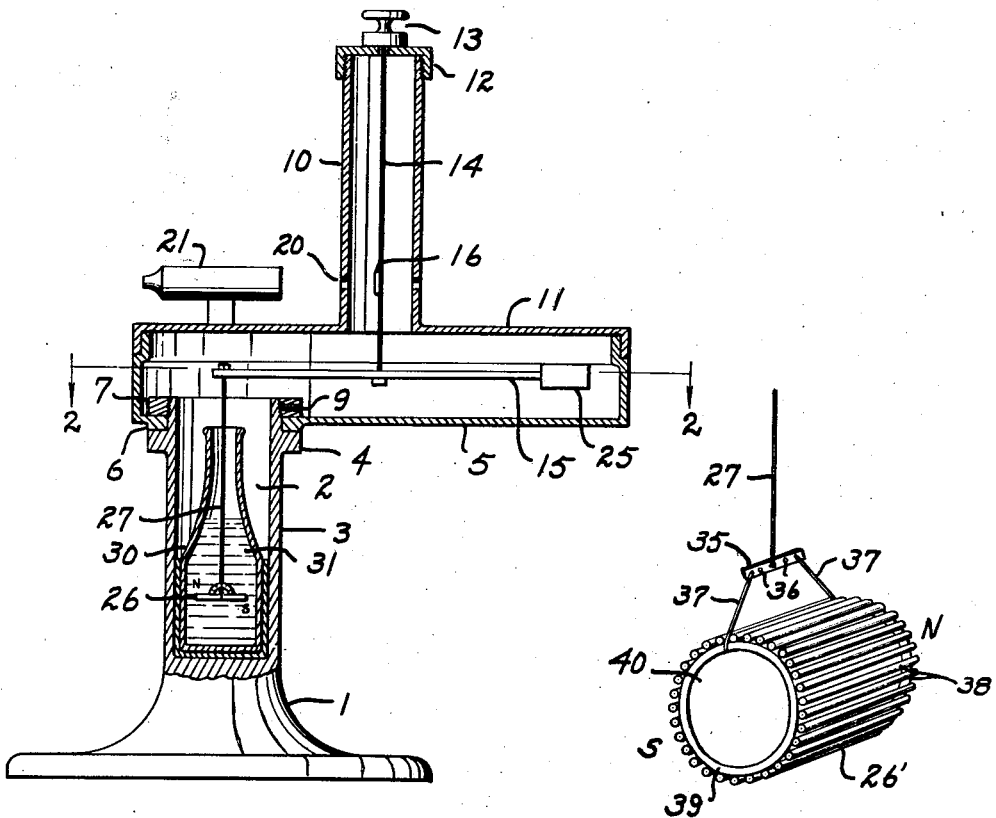
Fig. 1 is a side elevational view partly in section of a device embodying the invention.
Figures 2, 3:
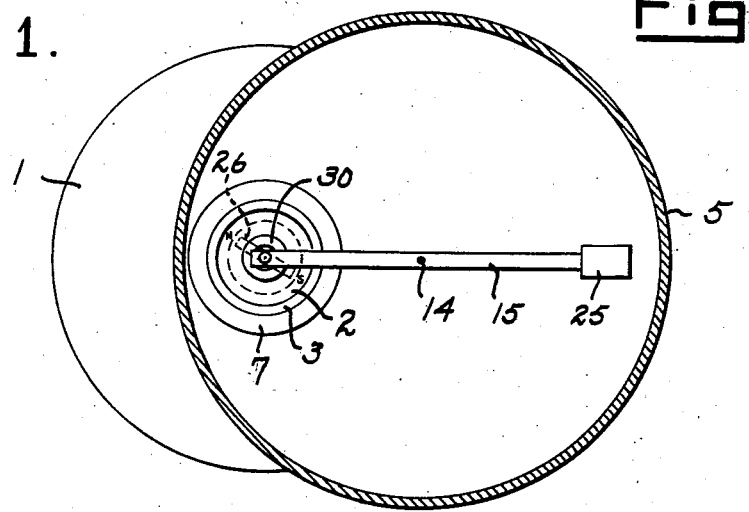
Fig. 2 is a plan view taken on line 2—2 in Fig. 1.
Fig. 3 is a perspective view of a modified form of the magnet comprising an element of the device of the invention.

In Figs. 1 and 2 the device of the invention is shown as comprising a pedestal or base 1 having a chamber 2 on the interior of the column 3 which is provided with an annular flange 4 adjacent its upper end. A housing 5 is provided with a hollow boss 6 which surrounds the column 3 and rests upon the flange 4 to support the housing. This housing is rotatably held in place upon the column 3 by means of a threaded collar 7 which is secured in place with the set screw 9.

The cover 11 for the housing 5 has an upwardly extending tubular projection 10 which is fitted at its upper end with a cap member 12 which cooperates with a knob 13 to form a torsion head. A suspension fiber 14 is attached to the head 13 and to a beam 15 within the housing, a mirror 16 being attached to the fiber so that rotational movement of the strand proximate the beam 15 can be observed through the opening 20 by means of the telescope 21 mounted upon the top of the housing.

A small weight or mass 25 is attached to one end of the light horizontal beam 15 and the composite weight and beam are balanced by a small bar magnet 26 suspended by a fiber 27 attached to the beam on the side opposite the mass 25. It is to be noted that in the balance system thus produced and suspended on the suspension fiber 14, the magnet 26 and the weight 25 are supported in spaced vertical relation. Each the weight 25 and the magnet 26 is attracted by the force of gravity and it is desirable that the mass of these elements be as small as possible since it is intended by the invention to eliminate gravitational effects from the results obtained so that only the micromagnetic effects are relied upon in the completed survey.

In order to further reduce the weight of the mass 25 and yet permit the use of a magnet 26 of desired physical dimensions and strength and also to provide the desired damping in the instrument, a container 30 is provided within the chamber 2 and a body of liquid 31 within the container entirely surrounds the magnet 26 whereby the effective weight of the magnet is materially reduced and the mass 25 can be reduced correspondingly in size.

In order to measure a given component of the translatoric magnetic force, as for example the north-south component of such force, the balance system is set with the weight 25 to the west. After an interval of time the balance system comes to rest and its position is observed by the optical system as described. The balance is then turned through an angle of 180° in a counterclockwise direction by rotating the housing 5 about the column 3. The suspension fiber 27 is coaxial with the column 3 and hence the magnet 26 remains stationary. After sufficient time has lapsed for the balance system to come to rest the position of equilibrium is again noted. The balance is then turned clockwise through 360° and a third observation is made. This complete turn of the balance is necessary to eliminate any shift of the magnet 26 from its original true north-south position as the result of torque in the suspension fiber 14 brought about by the 180° turn. From these observations the north-south component of the magnetic force can be determined.

For measurement of the west-east component of the translatoric magnetic force the foregoing procedure is followed with the exception that the weight 25 is directed to the south in the first position.

It is to be understood that the pedestal 1, the column 3 and the container 30, as well as other elements of the construction will be of such material and dimensions that there will be no interference with the accurate measurements of the magnetic anomalies of which information is sought.

In Fig. 3 there is shown a modified form of magnet which comprises a magnet assembly 26' suspended upon the strand 27. The lower end of the strand 27 is attached to a small bar 35 which has a plurality of holes 36. The strand 27 may be secured within any of these holes whereby the magnet assembly is supported in desired position upon the strands 37 which are attached to the bar 35 and to the magnet assembly.

The assembly 26' comprises a plurality of magnetized bars or needles 38 arranged about a common axis and with their like poles extending in a common direction. Interiorly of the magnetized bars is a closed container 40 of suitable material, preferably nonmagnetic, and this container is of such dimensions that the magnet assembly as a whole, is of substantially the same specific gravity as the liquid 31 in the container 30. In this manner the weight or mass 25 may be very small and the gravitational effects influencing the instrument are likewise small. The magnet assembly 26' acts as a relatively strong magnet and yet the gravitational effects thereon are very small. Hence the instrument is very sensitive to magnetic anomalies when using this modified form of magnet assembly.

Figure 4:
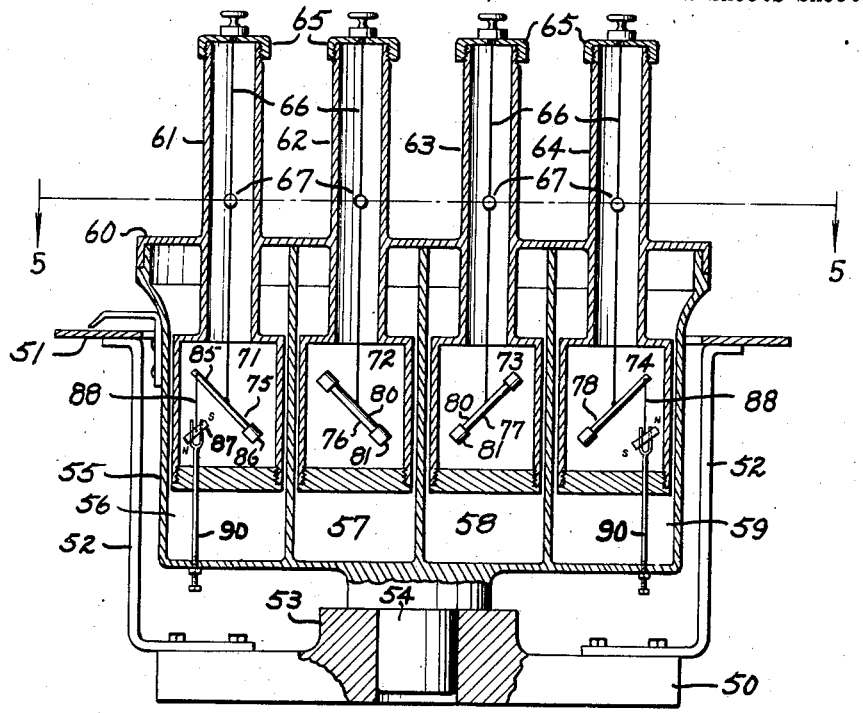
Fig. 4 is an elevational view partly in section of a modified form of device.
Figure 5:
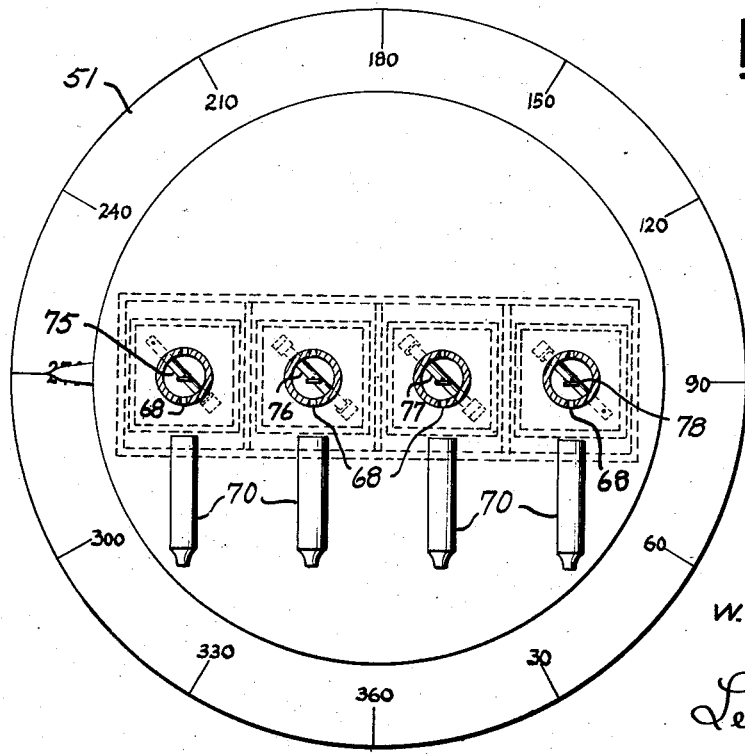
Fig. 5 is a plan view taken on line 5—5 in Fig. 4.

Fig. 4 shows a construction in which the gravimetric influence is measured simultaneously with the magnetic influence so that such gravimetric influence may be completely eliminated from the final results. This embodiment comprises a base 50 upon which is mounted a circular scale 51 upon upwardly extending standards 52. The base 50 has a circular hollow boss 53 to receive the spindle 54 at the lower end of the multiple housing 55 having four compartments 56, 57, 58 and 59. The cover 60 for the housing 55 includes suspension strand housings 61 to 64, each of which is provided with a torsion head 65. Suspension strands 66 are attached to the heads 65 and each is provided with a mirror 67. These mirrors may be viewed through the openings 68 in the housings by means of the telescopes 70 mounted upon the cover 60.

The lower ends of the torsion strand housings 61 to 64 are enlarged to form chambers 71 to 74 to accommodate the respective balance systems 75 to 78.

The balance systems 76 and 77 are identical in construction but are displaced angularly relative to each other whereby single observation of these gravity responsive systems provides a reading for each of two azimuths. Each of these balance systems comprises an inclined beam 80 suspended upon one of the strands 66 and has a small mass 81 attached to each end. It seems apparent that the masses 81 lie in separate horizontal planes and that therefore the gravimetric pull upon the two masses is different. Accordingly the final positions assumed by these moving systems will depend upon the gravitational gradient as is well known in the use of the gravimetric torsion balance.

The moving systems in the chambers 71 and 74 are likewise identical but are oriented at an angle relative to each other so that a single observation suffices to obtain information of magnetic conditions in two azimuths. Each of these moving systems comprises an inclined beam 85 suspended upon one of the strands 66. A mass 86 is attached to the lower end of each of the beams and a bar magnet 87 is suspended from the opposite end of the beam by means of the suspension fiber 88.

Observations may be made with the alternative embodiment as described in connection with Figs. 1 and 2. It is to be noted, however, that rotation of the housing 55 does not take place about the axis of either of the suspension strands 88. To minimize the difficulty in making observations whereby the torsion in the strand 88 is eliminated, a yoke 90 is provided in each of the chambers 71 and 74 and the stem of such yoke extends through the bottom of the housing 55 whereby the magnet system in each of these chambers may be rotated manually and in this manner rotation of the entire assembly including the housing 55 for the purpose of making complete observations may be avoided.

While specific means and technique have been described herein it is to be understood that the invention is not confined thereto. For example, it is obvious that the operating steps set forth in the mode of operation may readily be effected automatically as has been accomplished with the torsion balance in the manner described by Ambronn in "Elements of Geophysics," pp. 23, 24, McGraw Hill Book Company, Inc., New York, 1928, without departing from the invention. In such operation there is the choice of clockwise and counterclockwise rotation of the instrument or clockwise rotation combined with an individual rotation through 360 degrees of the magnet at a specific azimuth of the instrument.

Broadly, the invention comprehends an instrument and technique for obtaining accurate information of the existence and nature of magnetic anomalies as an indication of the nature, location and extent of subsurface earth formations.

What is claimed is:

1. In a device of the class described the combination of, a housing, a suspension fiber having one end attached to said housing, a balance beam attached to the other end of the fiber and suspended thereby, a mass fixed to said beam in spaced relation with the point of attachment to said strand, a second fiber attached to the beam opposite said mass, a bar magnet supported by said second fiber to balance said beams, and means for observing the position of rest of the beam whereby the magnetic gradient of the terrestrial magnetic field at the location of the instrument may be determined.

2. In a device of the class described the combination of a housing, a beam therein, a suspension fiber attached to the housing and beam whereby the beam is suspended in the housing, a mass on said beam, a second fiber attached to the beam and to a bar magnet to balance the beam on the first suspension and form a balance system, a mirror attached to and movable with the balance system, and means for observing the position of rest of said system.

3. A device of the class described comprising a beam suspended by a fiber, a magnet and a mass attached to said beam at the opposite sides of the point of suspension to form a balance system, said magnet and mass being in vertically spaced planes, and means for observing the position of balance of the system as a measure of the magnetic gradient at the point of location of the device.

4. A device of the class described comprising, a beam suspended by a fiber, a magnet and a mass attached to said beam at opposite sides of the point of suspension to form a balance system, a container surrounding the magnet, and a body of liquid within said container and surrounding the magnet, to produce a buoyant effect upon the magnet and to damp the movements of the magnet.

5. In a device of the class described a magnet assembly comprising a plurality of elongated magnetized members arranged in parallel relation about a closed chamber with like poles in a common direction, and means for attaching the assembly to a suspension fiber.

6. In a device of the class described a magnet assembly comprising a plurality of elongated magnetized members arranged in parallel relation about a closed chamber with like poles in a common direction, and means for attaching the assembly to a suspension fiber, said last mentioned means including means for adjustably supporting the assembly at different angles of inclination.

7. In combination, a beam suspended by a fiber, a container, a liquid in said container, a bar magnet suspended from said beam and immersed in said liquid, and a mass attached to said beam to counterbalance the magnet.

8. In a device of the class described, a base, a housing rotatably mounted thereon, two separate moving systems each including an inclined beam supported upon a suspension strand within the housing, a mass on the lowermost end of each beam, and a bar magnet suspended upon a fiber from the upper end of each beam, each of said magnets being suspended in a substantially common plane with the mass on the associated beam.

9. In a device of the class described, a base, a housing rotatably mounted thereon, two separate moving systems each including an inclined beam supported upon a suspension strand within the housing, a mass on the lowermost end of each beam, a bar magnet suspended upon a fiber from the upper end of each beam, each of said magnets being suspended in a substantially common plane with the mass on the associated beam, and means engageable with each of the moving systems and operable from the exterior of the housing for rotating the moving system to different azimuths so that the magnetic gradient may be determined by successive readings of the positions of rest of the moving systems.

10. In a device of the class described, a base, a housing rotatably mounted thereon, a moving system within said housing responsive to variations in magnetic and gravimetric gradient, and means in the housing for measuring the gravimetric gradient.

11. In a device of the class described, a base, a housing rotatably mounted thereon, a moving system within said housing responsive to variations in magnetic gradient, means for moving the housing to different azimuths and means for observing the position of rest of the moving system at the different azimuths whereby the magnetic gradient at the location of the device is measured.

12. The method of determining the gradient and direction of magnetic anomalies at the earth's surface comprising the steps of suspending upon a fiber a moving system comprising a mass and a magnet, and observing the position of rest of the moving system at different azimuths whereby the magnetic gradient of the terrestrial magnetic field is determined.

WILLIAM P. JENNY.